United States Patent

Berniolles et al.

[11] 3,962,032
[45] June 8, 1976

[54] FAST NUCLEAR REACTOR

[75] Inventors: Jean-Marie Berniolles, Pierrevert; Sabino Gallo, Paris, both of France

[73] Assignee: Commissariat a l'Energie Atomique, Paris, France

[22] Filed: Mar. 5, 1974

[21] Appl. No.: 448,395

[30] Foreign Application Priority Data

Mar. 7, 1973 France .............................. 73.08075

[52] U.S. Cl. ..................................... 176/65; 176/40
[51] Int. Cl.² ................... G21C 15/00; G21C 19/28
[58] Field of Search .................... 176/40, 62, 63, 65, 176/60

[56] References Cited
UNITED STATES PATENTS

| | | | |
|---|---|---|---|
| 3,203,867 | 8/1965 | Williams et al. .................. | 176/65 X |
| 3,382,153 | 5/1968 | Bigge et al. ............................ | 176/40 |
| 3,400,046 | 3/1968 | Barker .................................. | 176/40 |
| 3,498,880 | 3/1970 | Gollion ................................ | 176/65 |
| 3,719,558 | 3/1973 | Leclou ................................. | 176/65 |
| 3,784,443 | 1/1974 | Vercasson ............................ | 176/63 |

FOREIGN PATENTS OR APPLICATIONS 439,506   12/1967   Switzerland........................... 176/65

Primary Examiner—Samuel Feinberg
Assistant Examiner—Harold Tudor
Attorney, Agent, or Firm—Cameron, Kerkam, Sutton, Stowell & Stowell

[57] ABSTRACT

A fast reactor of the sodium-cooled type comprises a vertical main vessel for supporting the reactor core and an internal primary vessel for separating the hot sodium discharged from the reactor core from the cold sodium discharged from the heat exchangers. The primary vessel essentially has a shape of revolution about the vertical axis of the main vessel and is provided with a lateral skew section traversed by the heat exchangers and the sodium pumps. A turned-down edge located at the exterior of the primary vessel and forming an extension of the skew section is joined to the main vessel at the lower end.

5 Claims, 4 Drawing Figures

FIG. 3
FIG. 4
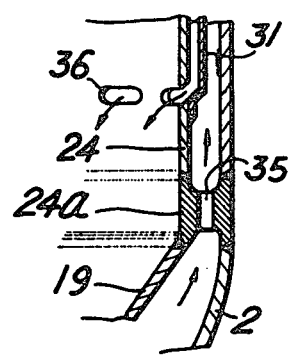
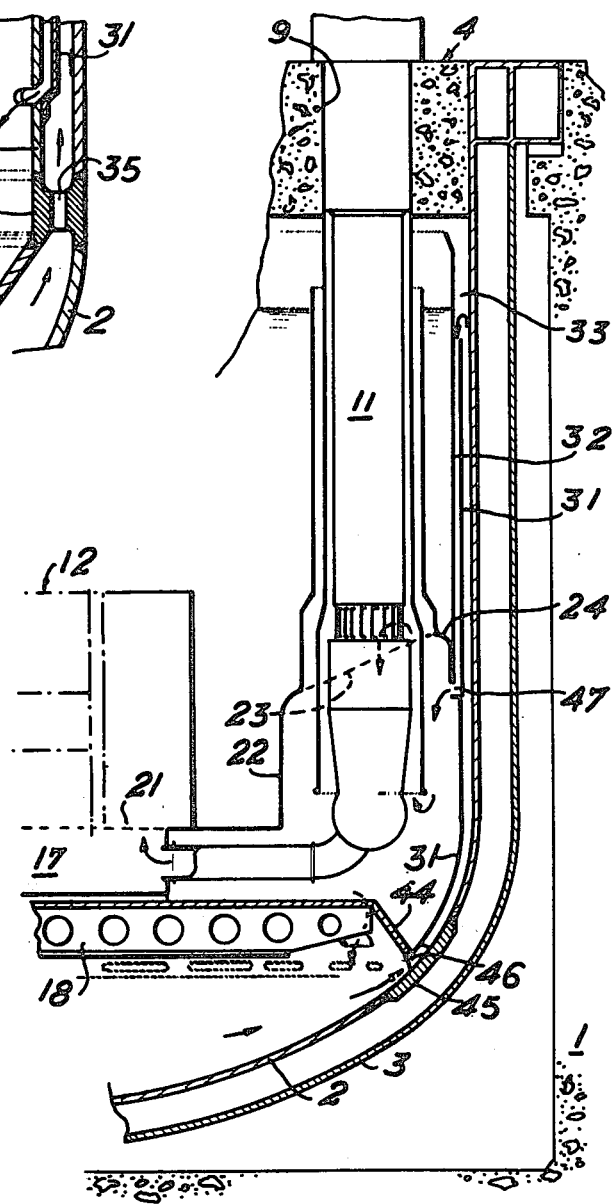

FAST NUCLEAR REACTOR

This invention relates to a fast nuclear reactor which is cooled by circulation of liquid metal, especially sodium, and which comprises a main reactor vessel having a vertical axis and designed to support the reactor core, a primary vessel placed inside the main vessel and containing the reactor core, the function of said primary vessel being to provide a separation between the hot liquid metal discharged from the reactor core and the cold liquid metal discharged from the heat exchangers which are immersed in the main reactor vessel, and pumps for circulating the cold liquid metal which is discharged from the heat exchangers and returned to the reactor core, the primary vessel being provided with a lateral skew section traversed by shells which the heat exchangers and the liquid-metal pumps are intended to penetrate.

In installations of this type which are derived from the so-called "integrated" design and in particular in the 250 MWe Phenix prototype reactor which has now been built, the general concept of the reactor consists in making provision within an outer shielding enclosure having concrete walls of substantial thickness for a first vertical leak-tight reactor vessel or so-called main vessel and within this latter for a second reactor vessel or so-called primary vessel which contains the reactor core and provides a separation between the hot sodium and the cold sodium. Said primary vessel has a lateral extension or skew section traversed by heat exchangers which collect the hot sodium, each heat exchanger being so arranged as to extend within the main vessel in a direction parallel to the vertical axis of the reactor core around this latter and to pass through the skew section so as to form an extension within the space located between the two vessels beneath said skew section in order to return the cold sodium into said space. The cold sodium is then recirculated by pumps mounted between the heat exchangers and returned to the reactor core, said pumps being also intended to traverse the skew section.

Although it has been fully tried and tested from a technical standpoint, this design solution appears unreliable when transposed to reactors of much higher power which call for a substantial increase both in the diametrical dimensions of the primary vessel and in the pressure difference arising from the difference in sodium levels between the interior and the exterior of said vessel. These more exacting conditions in conjunction with relative uncertainty in regard to the thermohydraulic regime of the sodium between the two vessels, which is liable to give rise to unexpected stresses, do not make it feasible to continue with the skew-section design of the Phenix type with a sufficient degree of reliability.

The aim of the present invention is to provide a novel fast-reactor structure comprising a main vessel and a primary vessel provided with a lateral skew section which circumvents the disadvantage mentioned in the foregoing, especially in the case of high-power reactors of the order of 1000 MWe.

To this end, the reactor under consideration is characterized in that the skew section is extended at the exterior of the primary vessel by means of a turned-down edge which is joined to the main vessel at the lower extremity thereof.

A "low" skew section will preferably be adopted, namely a skew section which is placed below the upper extremity of the reactor core and the top portion of which is located at a short distance above the heat-exchanger outlet level; this arrangement offers advantages both in regard to handling of fuel assemblies and in regard to the determination of thermal conditions as will be explained in greater detail hereinafter.

In accordance with a conventional arrangement, the reactor core which is mounted within the primary vessel is supported by a horizontal support grid extending beneath said vessel and connected by a lateral conical shell to the wall of the main vessel. In a first alternative embodiment, the turned-down edge of the skew section of the primary vessel is joined to the conical shell in proximity to the point at which said skew section is joined to the wall of the main vessel.

The main vessel thus supports the reactor core by means of the support grid and the conical shell and it proves particularly advantageous if not even essential to ensure dimensional stability of said vessel and especially to prevent this latter from giving rise to high values of differential thermal expansion. To this end, the main vessel is provided in the lateral wall thereof with at least one baffle-plate element which defines with said wall an annular space for the upward flow of cold sodium, and a counter-baffle plate element which defines with said baffle-plate element an annular space for the downward flow of the sodium which is derived from said upward flow and is returned into the cold sodium chamber located beneath the skew section of the primary vessel. In an alternative embodiment of the invention, the turned-down edge of the skew section of the primary vessel is joined to the wall of the counter-baffle plate element.

Further properties of a primary nuclear-reactor vessel as constructed in accordance with the invention will become apparent from the following description of two exemplified embodiments which are given by way of indication and not by way of limitation, reference being made to the accompanying drawings, in which:

FIG. 3 is a detail view of FIG. 2, which illustrates the connection of the primary vessel to the main vessel;

FIG. 4 is a view in part-sectional elevation showing an alternative form of construction of the reactor vessel under consideration.

Figure 1:
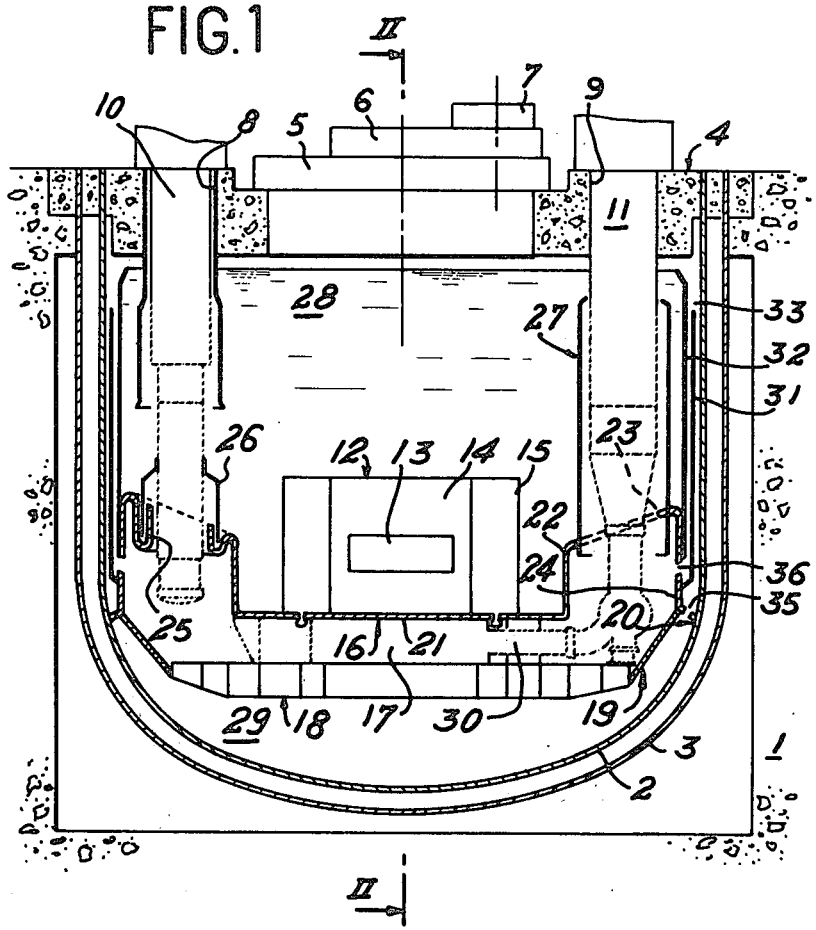
FIG. 1 is a diagrammatic longitudinal sectional view in elevation showing a fast reactor provided with a primary vessel in accordance with the invention.

There is shown diagrammatically in FIG. 1 a fast reactor which, as is usually the case in installations of this type, comprises a thick-walled external concrete structure or vault 1 defining an internal cavity having large dimensions in which is mounted a metallic and especially a steel vessel 2 which is referred-to as the main vessel and is intended to contain and support the reactor core as well as the mass of liquid sodium which serves to cool this latter. Said main vessel is surrounded externally by a parallel and coaxial jacket 3 which constitutes a safety vessel in the event of failure or of a fault condition occurring in the main vessel during operation. The vessels 2 and 3 are suspended at the top ends from a concrete slab or roof 4 of substantial thickness which closes the vault 1 and the reactor vessels and confines the active portion of the reactor within the internal cavity. Shield plugs such as the plugs 5, 6 and 7 are mounted within said vault roof 4 and are capable of relative rotational displacements to allow access to the reactor core by handling devices in a manner which is known per se; said handling devices will in any case be described in greater detail hereinafter. In the vault roof 4 are formed vertical penetrations such as those designated by the references 8 and 9 and provided respectively for mounting through said roof the heat-exchangers 10 and circulating pumps 11, one example of each of these latter being illustrated in diametrically opposite relation in FIG. 1; provision can be made for any number of heat exchangers and pumps which are suited to the operating characteristics of the reactor and preferably disposed in uniformly spaced relation about the vertical axis of the main vessel 2, each pump being so arranged as to correspond to one or two adjacent heat exchangers, for example.

The reactor core as generally designated by the reference 12 is placed within the interior of the vessel 2 and essentially comprises a fissile central portion 13 surrounded by fertile blanket assemblies 14 whilst neutron shielding assemblies 15 are placed on the sides of the reactor core in accordance with an arrangement which is essentially conventional. The reactor core 12 is placed within a second vessel 16 or so-called primary vessel and is carried by a diagrid 17 on a support grid 18. The peripheral portion of said grid 18 is in turn connected to a conical shell 19, the external edge of which is rigidly fixed at a point of attachment 20 to the side wall of the main vessel 2 which thus supports the reactor core and the vessel 16 by means of said shell and said support grid.

In accordance with the invention, the primary vessel 16 has a shape of revolution about the common vertical axis of the main vessel 2 and the reactor core 12 and has a horizontal base-plate 21 which constitutes the top portion of the diagrid 17 and a side wall 22 having an extension in the form of an outwardly-directed skew section 23 terminating in a turned-down edge 24 which is parallel to the side wall 22. In the example illustrated in FIGS. 1 and 2, said turned-down edge is intended to be connected by means of an annular flange 24a at the level of the attachment point 20 to the conical shell 19 and to the main vessel 2 (as shown in FIG. 3).

The skew section 23 of the primary vessel 16 is further provided at the level of the heat exchangers 10 and the pumps 11 with openings for the penetration of these components, part of which is thus placed inside the primary vessel and part of which is placed outside this latter. To this end, the skew section 23 is provided in the case of each heat exchanger 10 with an opening delimited by a vertical cylindrical collar 25 and this latter is capable of cooperating with a sleeve 26 which is rigidly fixed to the shell of the corresponding heat exchanger. These elements 25 and 26 are associated so as to form a baffleplate sealing system in which a suitable pressure of neutral gas can be maintained. These arrangements are preferably identical with the arrangements disclosed in U.S. Pat. No. 3,784,443 filed in the name of Commissariat a l'Energie Atomique on Aug. 4, 1971 in respect of "Device for the leak-tight assembly of heat exchangers in nuclear reactors". Similarly, the skew section 23 is associated with vertical cylindrical shells 27 at the point of penetration of the bodies of the circulating pumps 11.

The primary vessel 16 thus defines two separate regions within the main vessel: one region designated by the reference 28 comprises the reactor core 12 and collects the hot sodium at the sodium outlet whilst the second region designated by the reference 29 is delimited beneath the primary vessel 16 between this latter and the bottom of the main vessel 2 and forms a collector for the cold sodium. In order to flow from one region to the other, the hot sodium of the space 28 is caused to pass through the heat exchangers 10 and then discharged from these latter into the space 29, is freely distributed within said space before being recirculated by the pumps 11 and finally returned via circulation ducts 30 into the diagrid 17 for a further passage through the reactor core 12.

Figure 2:
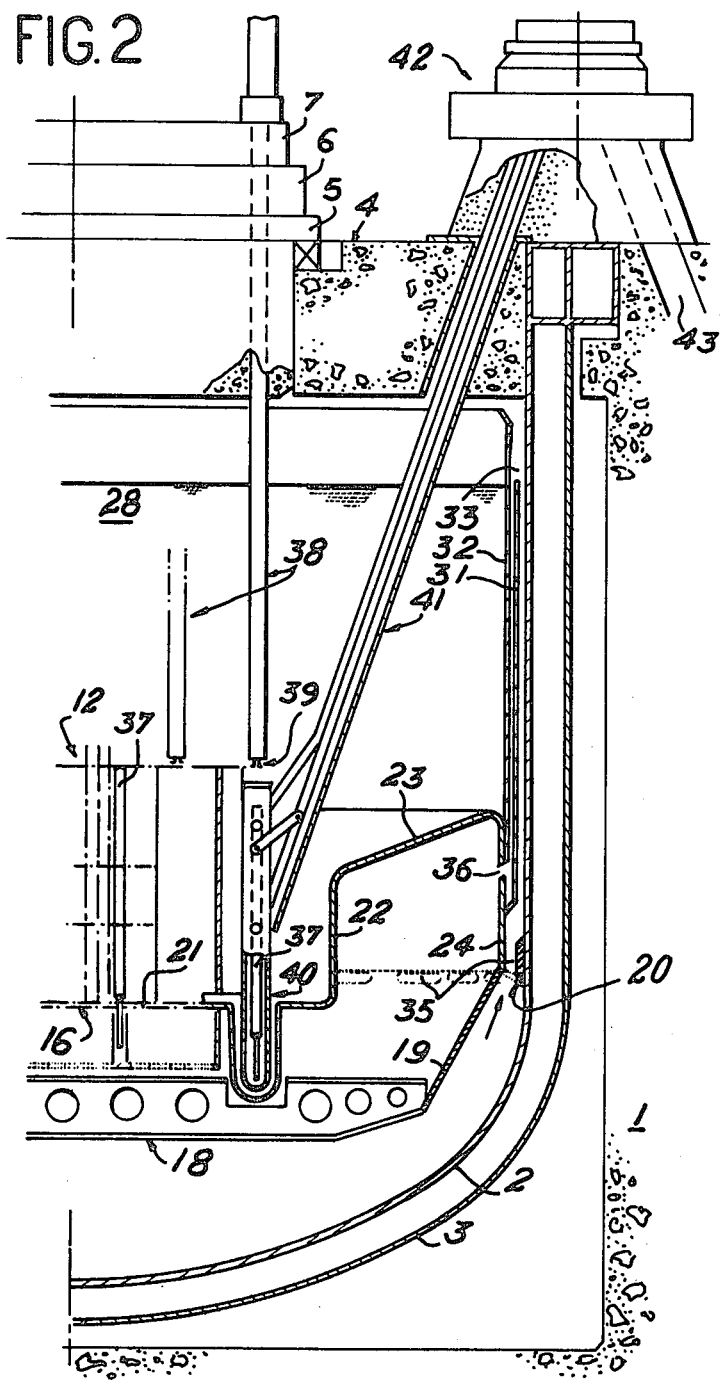
FIG. 2 is a half-sectional view to a larger scale and taken along line II—II of FIG. 1.

In the example of construction shown in FIGS. 1 and 2, the reactor core 12 is supported by the diagrid 17, the support grid 18 and the conical shell 19 on the main vessel 2 at the level of the point 20 of attachment of said shell to said vessel by means of the curved annular flange 24a (shown in FIG. 3) which is welded to the vessel wall and to the inner shell of said vessel. The main vessel therefore positions the reactor core itself and this makes it practically essential to ensure good dimensional stability of said vessel by limiting the temperature of this latter to a predetermined low value in order that the effects of differential thermal expansions may accordingly be reduced as far as possible. To this end, the side wall of the vessel 2 can be continuously cooled by a fraction of cold sodium which is withdrawn from the region 29 and circulated within a baffle-plate system delimited by a first cylindrical casing element 31 which extends parallel to said wall. There is in turn placed within this cylindrical baffle-plate element 31 a counter-baffle plate element 32 which enables the cold coolant sodium to flow along a double path in the vicinity of the wall, the baffle-plate elements 31 and 32 being such as to define a narrow annular space 33 between said elements and the vessel. Said space is preferably supplied with cold sodium through an inlet passage 35 provided at the lower end of the edge 24 of the skew section 23 beneath the conical shell 19, said sodium being permitted to escape after passing within the baffle-plate elements through an orifice 36 which is also formed in the edge 24 but beneath the lower end of the baffle-plate element 32.

Similarly in FIG. 2, there are shown a number of other essential reactor components and in particular the fuel assemblies 37 which constitute the reactor core 12 together with the active portion 13 and the blanket assemblies 14. In order that the fuel assemblies 37 may be either inserted in or withdrawn from the reactor core, provision is made for a fuel handling machine 38 which is mounted through the rotating shield plugs 5, 6 and 7. By displacing said shield plugs in relative movements of rotation, the handling grab 39 which is mounted at the lower end of the fuel handling machine can be brought into position above any assembly within the reactor core with a view to gripping and then depositing said assembly in a fuel reception bucket 40 at the periphery of the primary vessel. Said bucket can be displaced by a suitable link-rod system along a discharge ramp 41 which opens into a shielded transfer machine 42 mounted outside the concrete vault 1 on the closure slab or roof 4. The fuel assemblies thus removed from the reactor core can be transferred by said machine 42 onto a second ramp 43 and returned on this latter to a storage zone (not shown in the drawings).

The constructional design in accordance with the invention of a primary vessel having a bottom skew section of revolution provided with a turned-down edge extending towards the bottom portion of the main vessel offers a large number of advantages. In the first place and as illustrated in FIG. 2, no mechanical interference between the primary vessel and the fuel handling machine need be feared, and this holds for any design of handling machine which may be adopted. Moreover, the shape of revolution of the vessel permits easier determination of applied stresses at each reactor power level and more reliable calculation of its mechanical resistance. Finally, the actual structure of said vessel permits effective agitation of the sodium beneath the skew section within the cold-sodium collector which is partially delimited by this latter and also permits suitable cooling of said vessel, especially by utilizing the sodium streams which are discharged from the heat-exchanger outlets. Thus the presence of dead zones beneath the skew section is no longer possible and this limits natural convection phenomena to a considerable extent, exchanges with the hot sodium in the region located within the interior of the primary vessel above the skew section being carried out mainly by forced convection.

In another alternative form of construction of the skew section of the vessel as illustrated in FIG. 4, there is again shown the support grid 18 which carries the reactor core 12 by means of the diagrid 17; however, the shell which provides a connection between the support grid and the main vessel 2 is not joined to the turned-down edge 24 of the skew section in this case but bears on the bottom of the vessel 2 at the level of a strengthening piece 45. In this alternative design, the turned-down edge 24 of the skew section is joined directly to the lower end of the counter-baffle plate element 32; withdrawal of cold sodium as this latter circulates between the baffle-plate element 31 and the side wall of the main vessel 2 is carried out at the level of the extremity of the conical shell 44 through flow orifices 46, said sodium being discharged on the other side of the counter-baffle plate element 32 through holes 47 provided beneath the independent junction formed between the turned-down edge 24 of the skew section and the external surface of the counter-baffle plate element 32. By way of alternative, the lower end of the counter-baffle plate element could be replaced by the turned-down edge of the skew section. All the other arrangements contemplated in the exemplified embodiment of FIGS. 1 and 2 are otherwise retained.

As is readily apparent, the invention is clearly not limited to the examples of construction which have been more especially described in the foregoing but extends on the contrary to all alternative forms.

We claim:

1. A fast reactor cooled by liquid sodium comprising a main reactor vessel having a vertical axis a reactor core supported by said main vessel, a primary vessel within said main vessel and containing said reactor core, said primary vessel separating hot liquid sodium discharged from said reactor core and cold liquid sodium, heat exchangers within said main reactor vessel, pumps circulating the cold liquid sodium discharged from said heat exchangers to said reactor core, an annular lateral skew section for said primary vessel, openings through said section receiving said heat exchangers and said pumps, said primary vessel having a shape of revolution about the vertical axis of said main vessel, a turned down edge for said skew section at the exterior of said primary vessel and means joining said turned down edge to said main vessel at a lower extremity of said edge, outlets of said heat exchangers being adjacent the lower surface of said skew section.

2. A fast reactor according to claim 1, said skew section of said primary vessel being below an upper extremity of said reactor core and a top portion of said skew section being a short distance above outlet levels of said exchangers.

3. A fast reactor according to claim 1, including at least one baffle-plate element for said main vessel, an annular space between said plate and said main vessel for the circulation of an upward flow of cold liquid sodium discharged from said heat exchangers and a counter-baffle-plate element and an annular space between said baffle-plate and said counter-baffle-plate through which said liquid sodium circulates downwards at the same flow rate into the cold liquid sodium.

4. A fast reactor according to claim 1 including a horizontal support grid for said reactor core, a lateral conical shell connecting said grid to said main vessel, turned down edge of said skew section of said primary vessel being joined directly to said conical shell adjacent the junction of said skew section with said main vessel.

5. A fast reactor cooled by liquid sodium comprising a main reactor vessel having a vertical axis, a reactor core supported by said main vessel, a primary vessel within said main vessel and containing said reactor core, said primary vessel separating hot liquid sodium discharged from said reactor core and cold liquid sodium, heat exchangers within said main reactor vessel, pumps circulating the cold liquid sodium discharged from said heat exchangers to said reactor core, an annular lateral skew section for said primary vessel, openings through said section receiving said heat exchangers and said pumps, said primary vessel having a shape of revolution about the vertical axis of said main vessel, a turned down edge for said skew section at the exterior of said primary vessel, at least one baffle-plate element and one counter-baffle-plate element for said main vessel which define with said vessel wall an annular space for circulating a flow of cold liquid sodium, and means joining said turned down edge of said skew section of said primary vessel to said counter-baffle-plate element.

* * * * *